United States Patent [19]
Onishi et al.

[11] Patent Number: 5,208,791
[45] Date of Patent: May 4, 1993

[54] SYSTEM FOR RECOVERING A CD IN A CD PLAYER HAVING A MAGAZINE CONTAINING A PLURALITY OF DISKS

[75] Inventors: Sei Onishi; Atsushi Kurosawa; Kiyoshi Morikawa; Kaoru Takemasa; Kiyohito Kajihara; Osamu Kitazawa, all of Saitama, Japan

[73] Assignee: Pioneer Electronic Corporation, Tokyo, Japan

[21] Appl. No.: 892,712

[22] Filed: May 29, 1992

Related U.S. Application Data

[63] Continuation of Ser. No. 616,536, Nov. 21, 1990, abandoned.

[30] Foreign Application Priority Data

Feb. 16, 1990 [JP] Japan ............................. 2-35451
Feb. 16, 1990 [JP] Japan ............................. 2-35453
Feb. 16, 1990 [JP] Japan ............................. 2-35454
Feb. 16, 1990 [JP] Japan ............................. 2-35462
Feb. 16, 1990 [JP] Japan ............................. 2-35463

[51] Int. Cl.⁵ ............................................ G11B 17/00
[52] U.S. Cl. ................................. 369/36; 369/38; 369/75.2

[58] Field of Search ................... 369/36, 38, 39, 77.1, 369/77.2, 75.2, 34, 75.1; 360/92, 99.02, 99.03

[56] References Cited

U.S. PATENT DOCUMENTS 4,674,080  6/1987  Higuchi et al. ............... 369/77.2
4,701,900 10/1987  Hasegawa et al. ............. 369/36
4,730,291  3/1988  Ikedo et al. .................. 369/36
4,733,314  3/1988  Ogawa et al. ................. 369/77.2 X Primary Examiner—Eugene R. LaRoche
Assistant Examiner—Tan Nguyen
Attorney, Agent, or Firm—Nikaido, Marmelstein, Murray & Oram

[57] ABSTRACT

A CD player has a magazine containing a plurality of trays each of which mounts a CD, and a moving device for moving one of the CDs between the magazine and a playback position. The starting of the operation of the moving device for moving the CD from the playback position to the magazine is detected and a CD start signal is produced. When the CD does not arrive to the magazine after a predetermined time from the production of the CD start signal, the CD is returned to the the playback position and moved from the playback position to the magazine again.

3 Claims, 19 Drawing Sheets

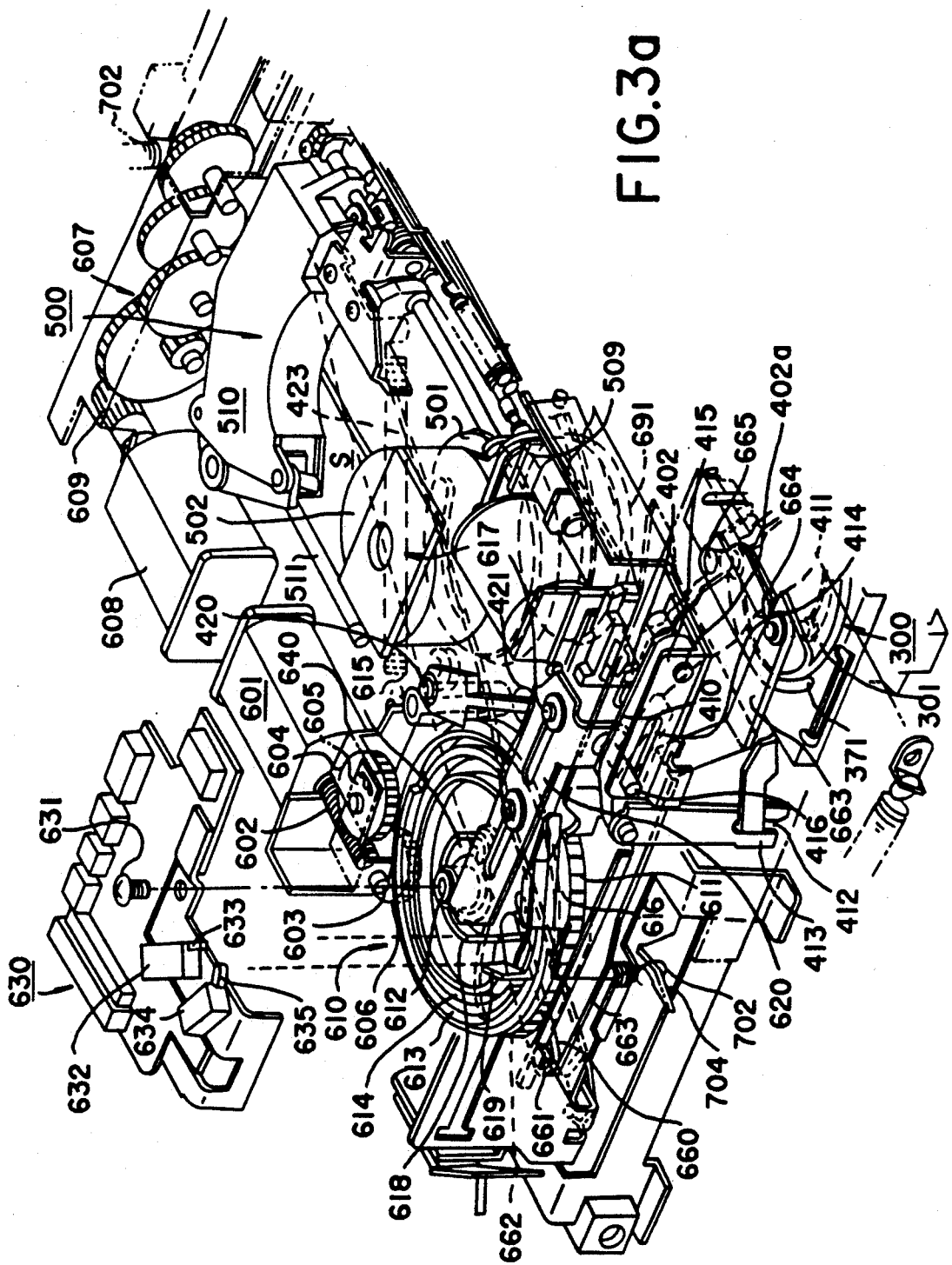

FIG.5
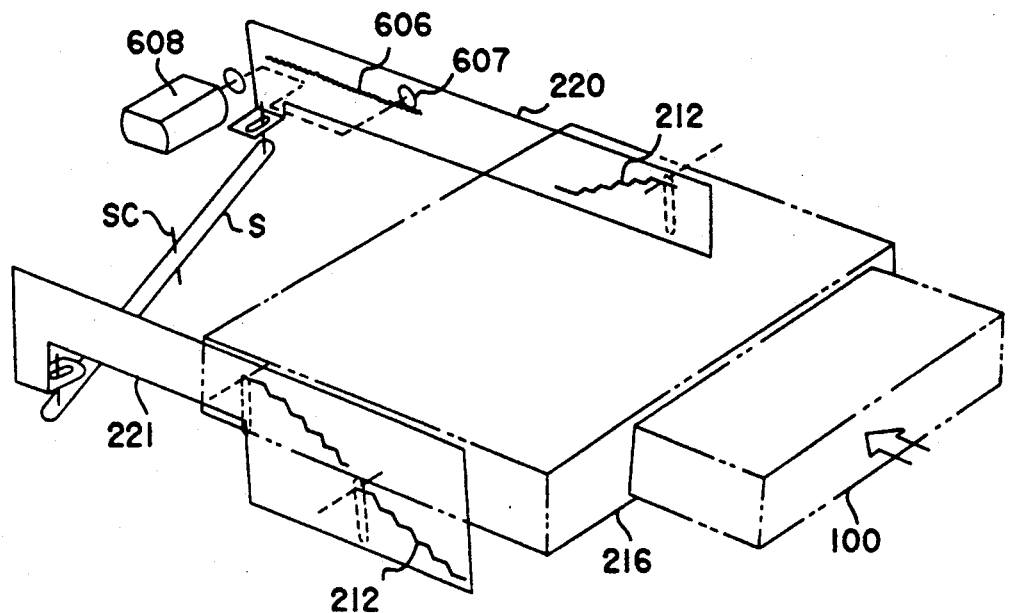
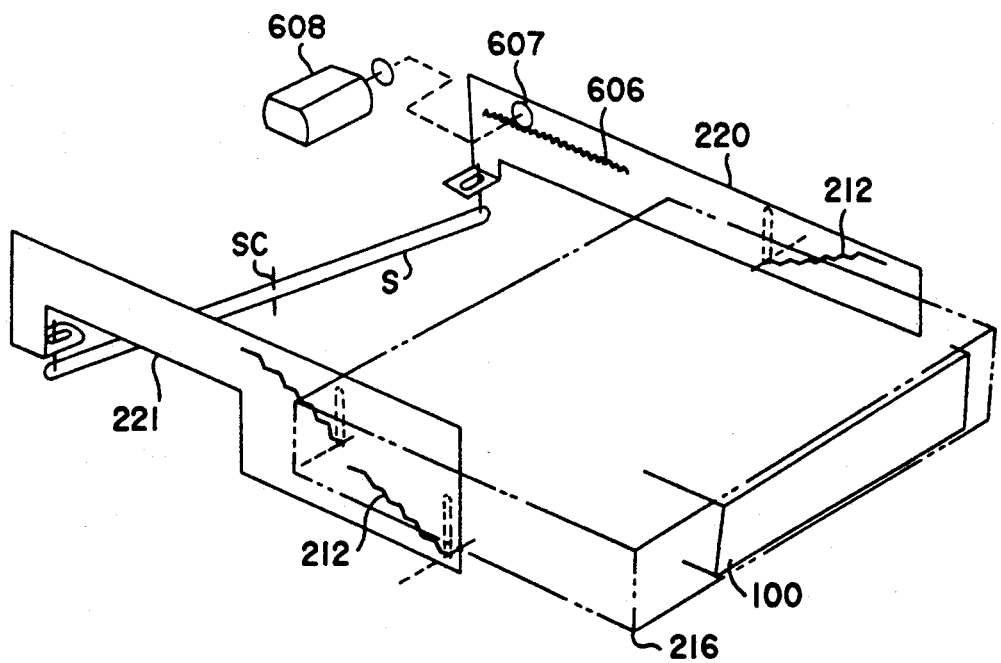
FIG.6

SYSTEM FOR RECOVERING A CD IN A CD PLAYER HAVING A MAGAZINE CONTAINING A PLURALITY OF DISKS

This application is a continuation of application Ser. No. 616,536 filed Nov. 21, 1990, now abandoned.

BACKGROUND OF THE INVENTION

The present invention relates to a system for recovering a compact disk (CD) in a CD player which can continuously play a plurality of disks mounted in a magazine.

The CD player with the magazine has an automatic loading device for loading and unloading a tray holding a CD. In the car CD player, it may occur that a part of the tray is caught by a member of a mechanism in the player in the unloaded operation. This is caused by a small space in the player which is required for the car CD. If the unloading tray is stopped, subsequent CDs cannot be played.

SUMMARY OF THE INVENTION

The object of the present invention is to provide a system which may recover a CD caught by another member in a CD Player.

According to the present invention, there is provided a system for recovering a CD in a player having a magazine containing a plurality of trays each of which mounts the CD, a moving device for moving one of the CDs between the magazine and a playback position, the system comprising first detector means for detecting starting of the operation of a starting of the operation of the moving device for moving the CD from a starting position in either of the magazine or the playback position to a terminal position and for producing a CD start signal, second detector means for detecting finishing of the operation of the moving device for moving the CD to the terminal position and for producing a CD arrival signal. A control unit is provided for operating the moving device for returning the CD to the starting position when the CD arrival signal is not supplied thereto after a predetermined time from the production of the CD start signal.

In an aspect of the invention, the starting position is the magazine and the terminal position is the playback position.

The system further comprises third detector means for detecting existence of the CD between the magazine and the playback position and for producing a CD staying signal, and the control means further responsive to the CD staying signal for returning the CD to the playback position and for moving the CD from the playback position to the magazine again.

The other objects and features of this invention will become understood from the following description with reference to the accompanying drawings.

BRIEF DESCRIPTION OF THE DRAWINGS

FIGS. 3a and 3b show an exploded perspective view of the car CD player;

FIGS. 5 and 6 are perspective views showing a magazine holder elevating device;

DETAILED DESCRIPTION OF THE PREFERRED EMBODIMENT

Figure 1A:
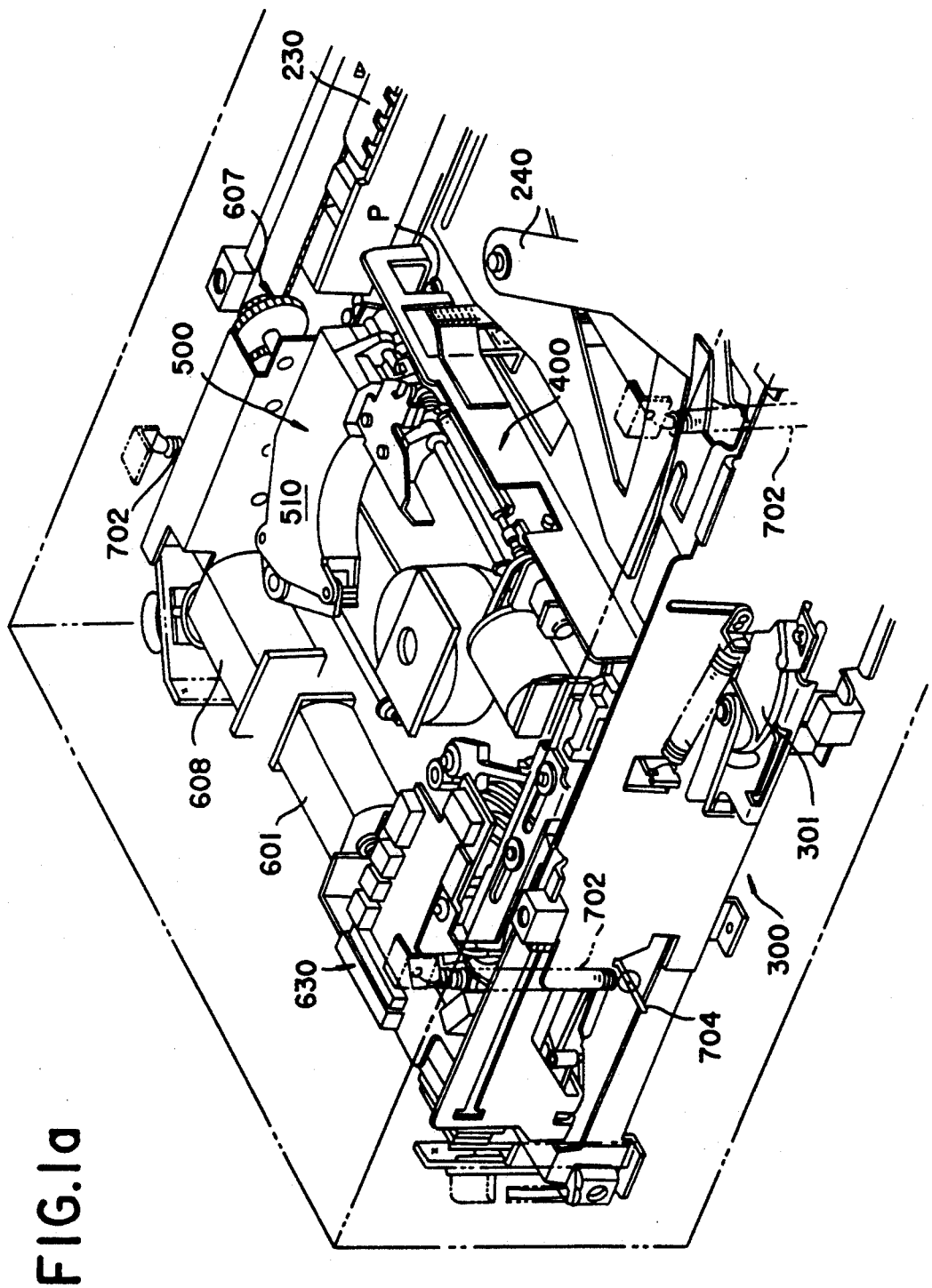
FIGS. 1a and 1b show a perspective view of a whole of a car CD player according to the present invention.
Figure 1B:
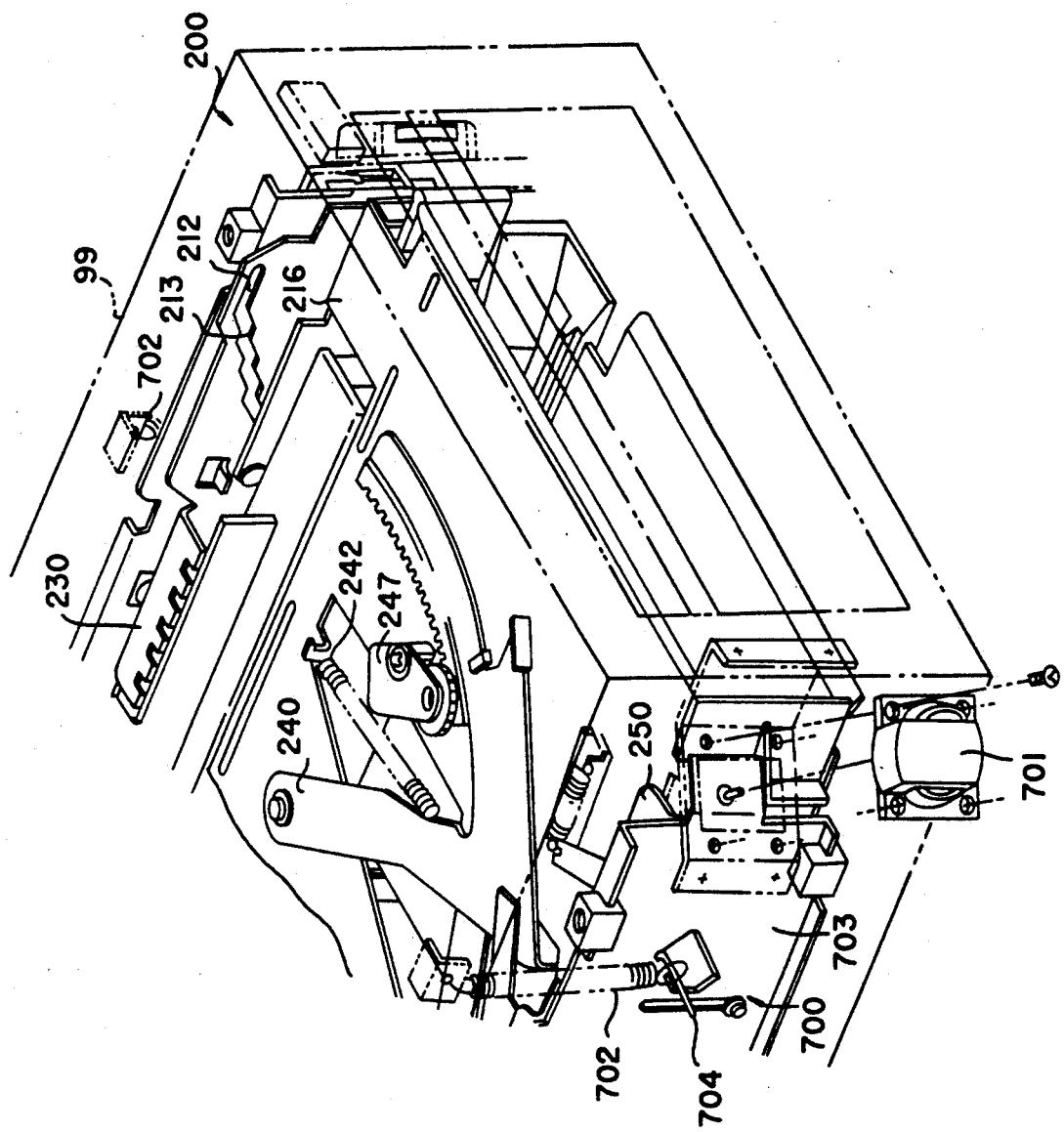

Referring to FIGS. 1a and 1b, the car CD player is adapted to be mounted in a trunk of a motor vehicle and remotely controlled by operating a control unit mounted in a dashboard. The CD player comprises a magazine mounting device 200 having a magazine holder 216 for mounting a magazine 100 (FIG. 2), a loading device 300 for loading a selected tray in the magazine, a clamp device 400 for removing a CD from the tray and clamping it to a turntable, and a reproducing device 500 having a pickup 510. These components are housed in a frame 700 supported in a casing 99 through dampers 701 and damping springs 702. A spring retainer 704 for the damping spring 702 is projected at 45 degrees from each side plate 703 of the frame 700.

Figure 2A:
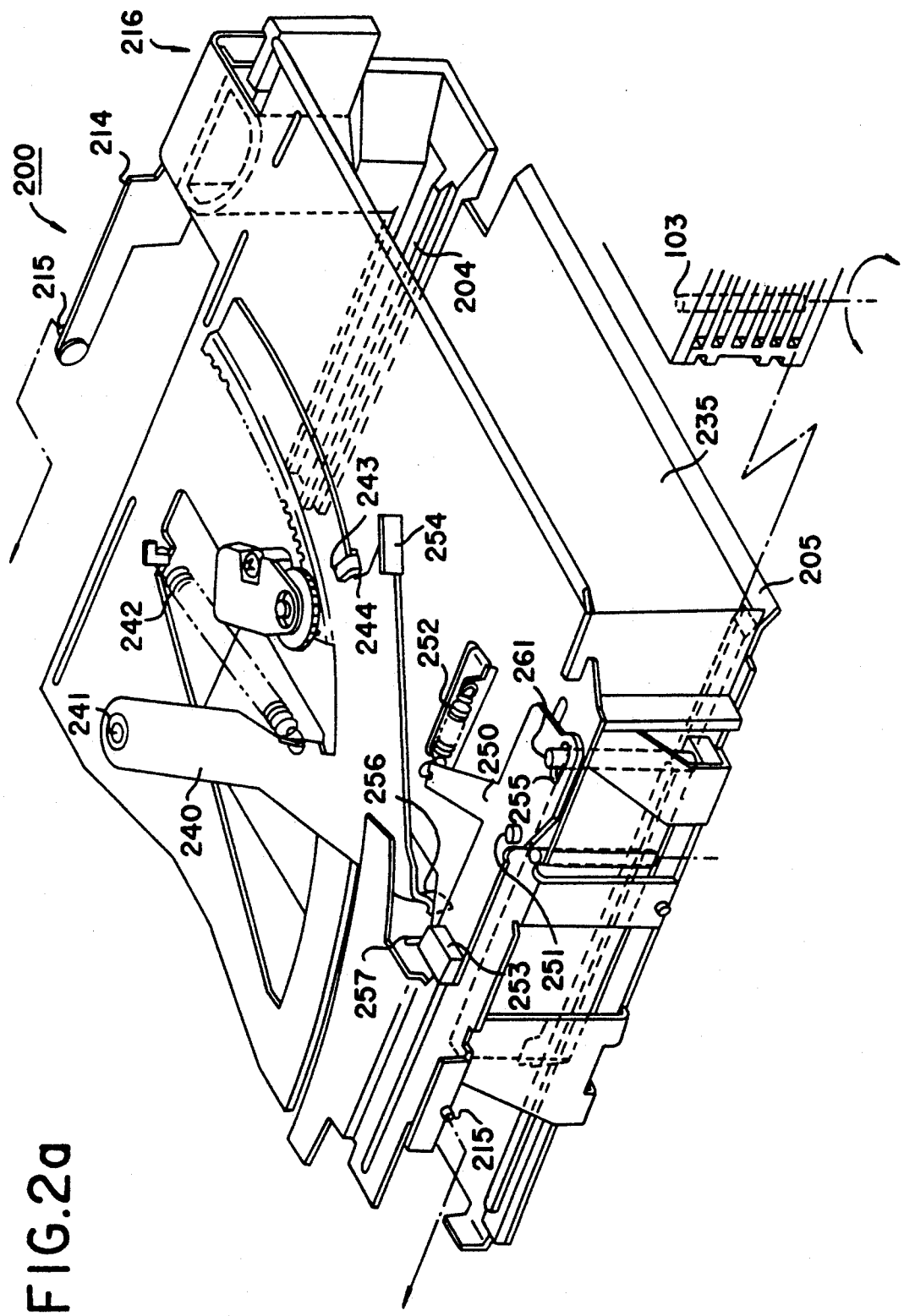
FIGS. 2a and 2b show a perspective view of the car CD player and a magazine.
Figure 2B:
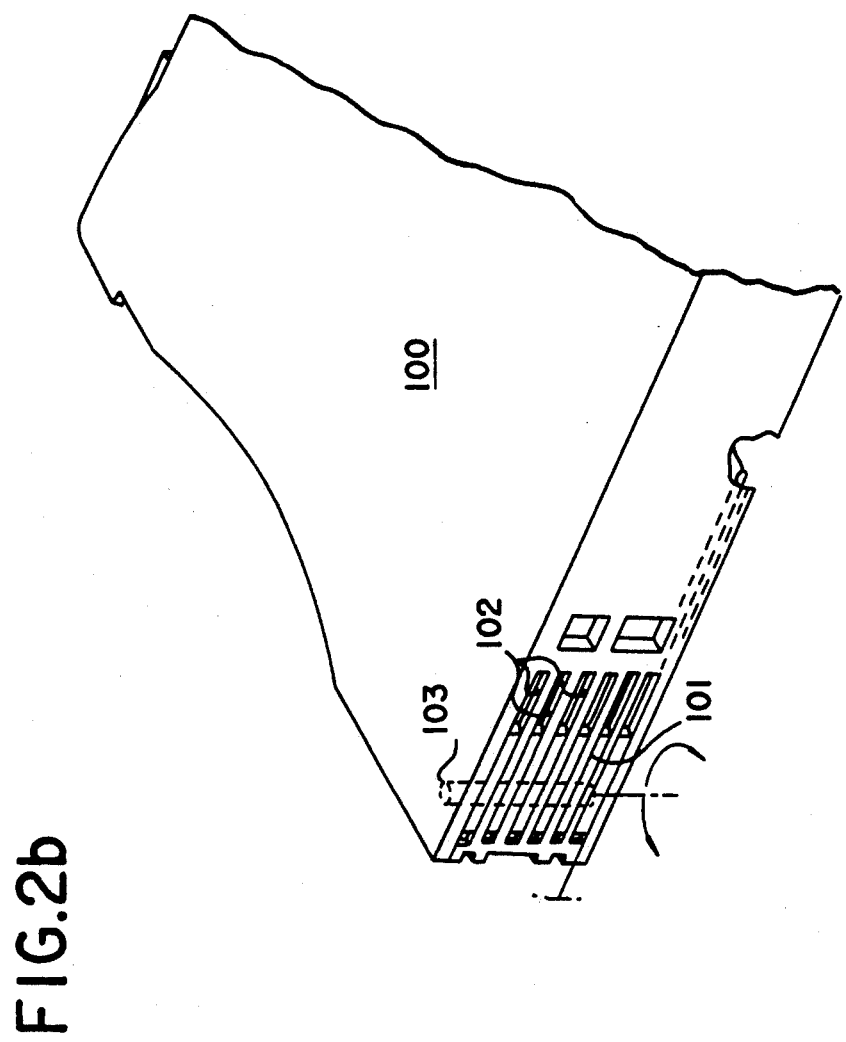
Figure 3B:
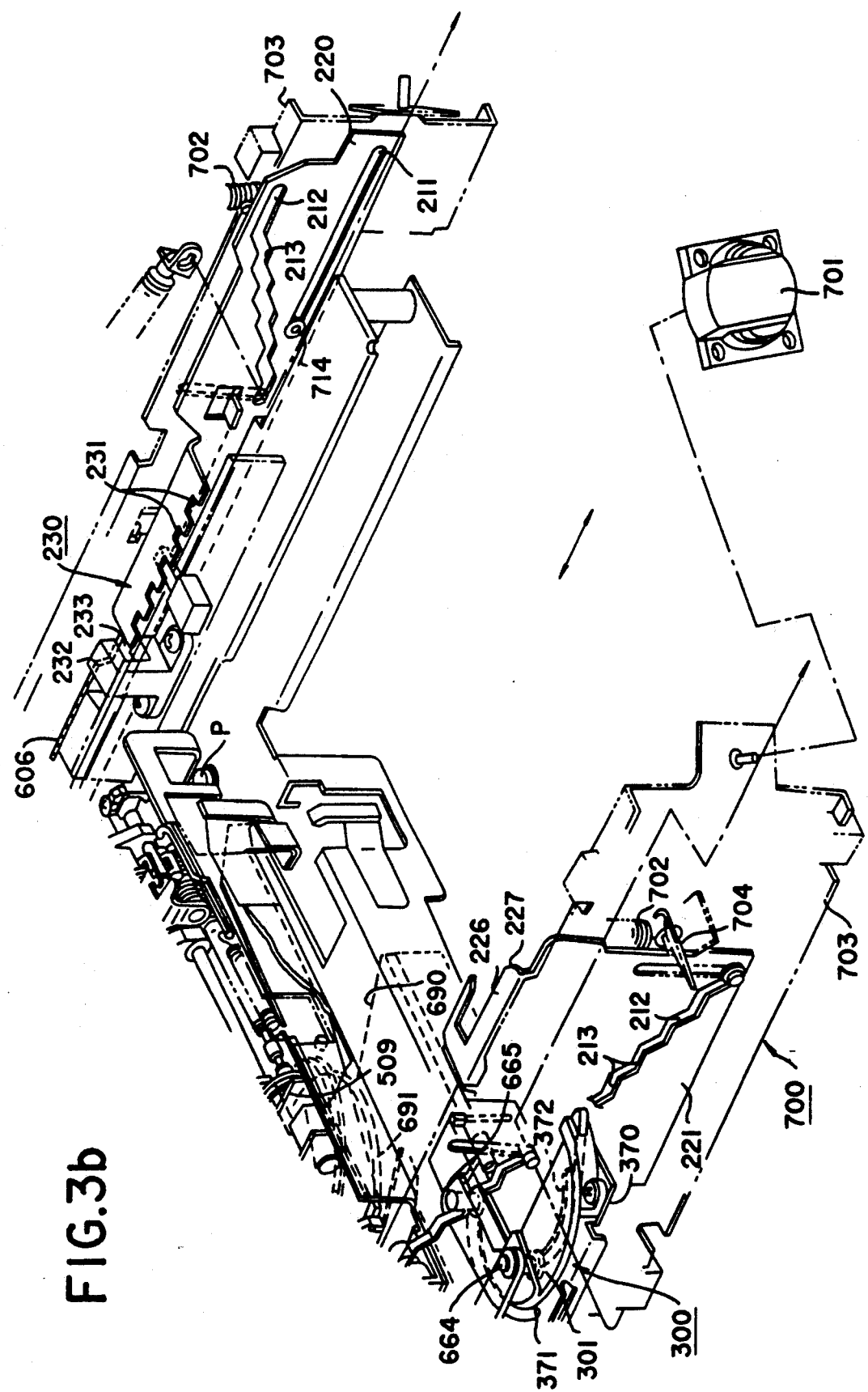
Figure 4:
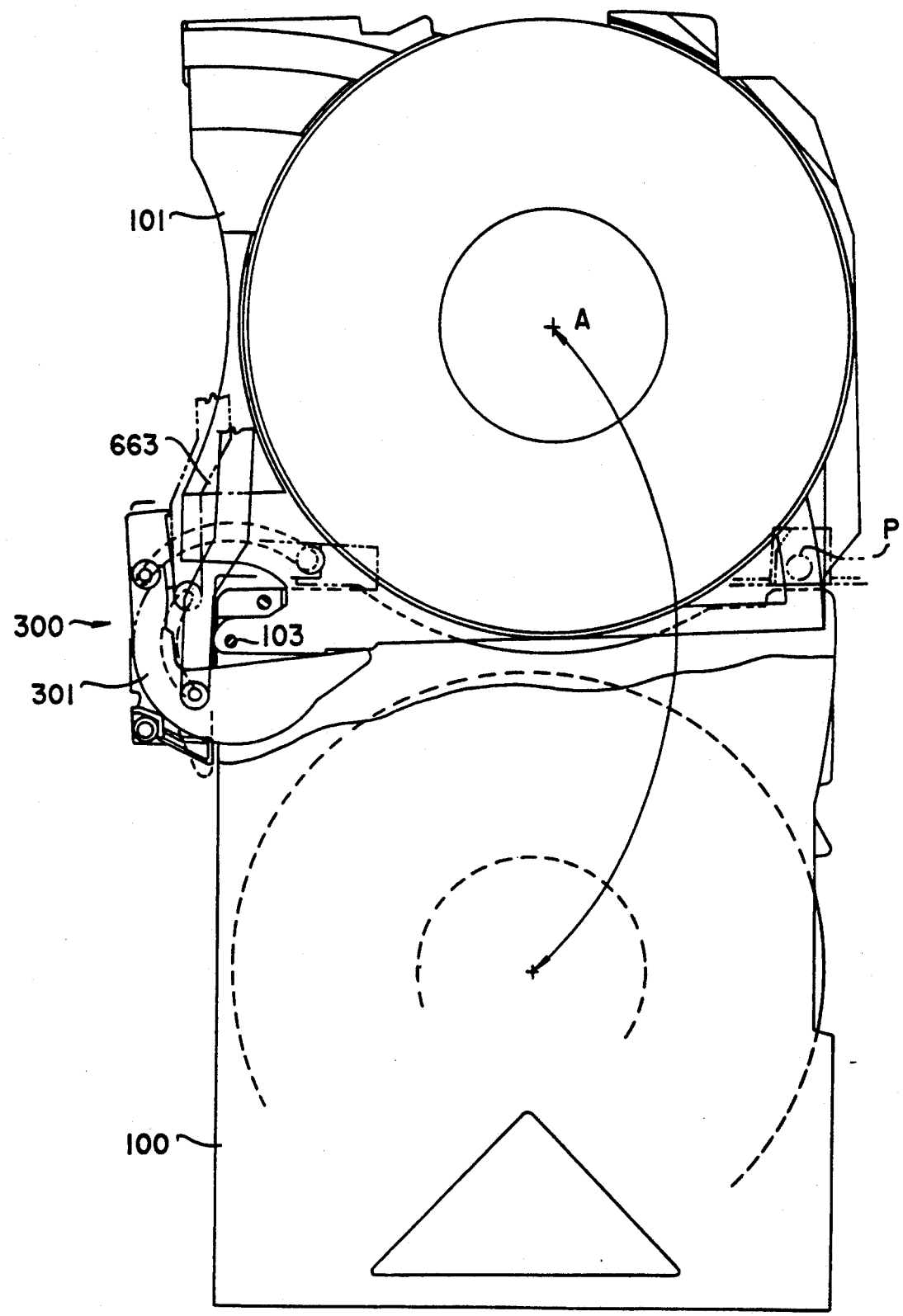
FIG. 4 shows a device for moving a tray mounting a CD between the magazine and a playback position.

Referring to FIGS. 2a, 2b and 4, a plurality of trays 101 are housed in the magazine 100. The magazine has openings 102 at a side thereof, corresponding to the trays. A loading lever 301 of the loading device 300 engages one of the trays 101 through the opening 102, and causes it to rotate about an axis 103 (as shown by an arrow) to a playback position A in the player.

Referring to FIGS. 3a, 3b, 5 and 6, slide plates 220 and 221 are slidably mounted on inside walls of the side plates 703, respectively. Each slide plate has a guide groove 211 with which a pin 714 on the side plate 703 is slidably engaged so as to guide the slide plate in the longitudinal direction. Both slide plates are connected by a lever S as shown in FIG. 5. The lever S is pivotted at a central portion SC, so that both slide plates are moved in the opposite directions. Each slide plate has a stepwise supporting groove 212 having a plurality of steps 213.

The number of the steps is the number of the CD stowed in the magazine, that is six in the embodiment. In each groove, a pin 215 provided on a projection 214 projected from the magazine holder 216 is slidably engaged. Both the supporting grooves 212 are inclined in the opposite directions, so that the magazine holder 216 is vertically moved when the slide plates 220 and 221 move in the opposite directions.

On the slide plate 220, a position detector plate 230 having six slits 231 is formed, corresponding to the vertical position of the magazine holder.

A photosensor 232 is provided to detect the position of one of the slits 231, that is the position of the CD to be played.

The slide plate 220 has a rack 606 on an upper edge thereof, with which an end gear of a gear train 607 engages. The other end gear 609 of the gear train 607 is secured to a rotating shaft of a motor 608 mounted on the frame 700.

On the magazine holder 216, a swing lever 240 having a magazine abutting end 256 and a switch operating end 254 is pivotally mounted by a pin 241. The lever 240 is urged by a spring 242, so that an end 244 is abutted to a projection 243.

A lever 250 is pivotally mounted on the magazine holder 216, pivotted by a pin 251. The lever 250 is urged by a spring 252, abutting a side of an elongated hole 255 formed therein on a pin 261. A switch 253 is mounted on the lever 250 so that an actuating lever 257 thereof is operated by the switch operating end 254.

Figure 23:
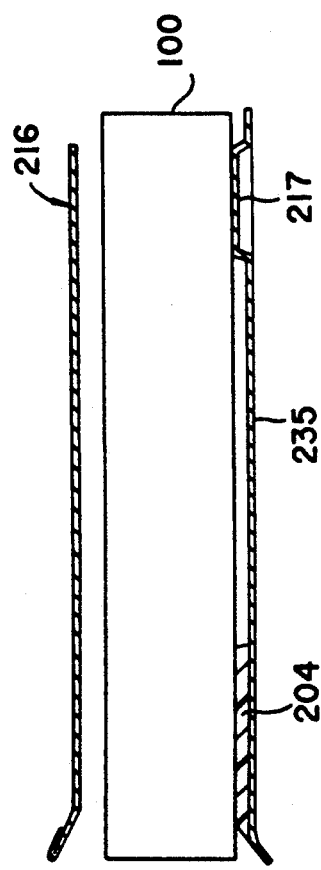
FIG. 23 is a side view showing a magazine guide.

The magazine holder 216 has an opening 205 for receiving the magazine 100 and a bottom 235. As shown in FIG. 23, on the bottom 235, an elongated plastic guide 204 is attached at an entrance zone of the magazine holder. In an inner zone of the holder 216, a metal guide 217 is formed by projecting a part of the bottom 235. Namely, guide projections for guiding the insertion of the magazine 100 are formed by the plastic guide 204 and the metal guide 217. Since the length of the plastic guide 204 is reduced by the length of the metal guide 217, the variation of the length of the plastic guide caused by thermal expansion is small compared with a plastic guide provided over the whole length of the magazine holder. Thus, the accuracy of the plastic guide for guiding the magazine is ensured. For preventing the difference between thermal expansions of the bottom 235 and the plastic guide 204, it is preferable to attach the plastic guide by engaging a part of the guide with an elongated slit formed in the bottom.

A motor 601 is mounted on the frame 700 for driving various mechanism. Securely mounted on a rotating shaft of the motor 601 is a worm 602 which is engaged with a worm wheel 604 rotatably mounted on a supporting plate 640. A thrust screw 603 is mounted on the plate 640 so as to receive the thrust of the worm 602. By rotating the screw 603, the gap between the screw and the end of the worm is adjusted.

Figure 7:
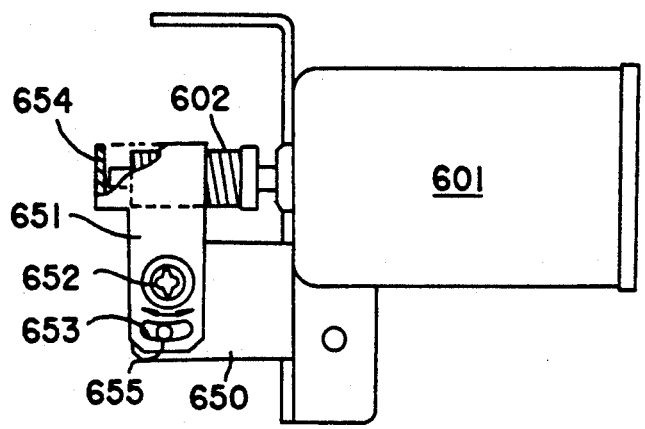
FIGS. 7, 8 and 9 are plan views showing a thrust receiving means.
Figure 8:
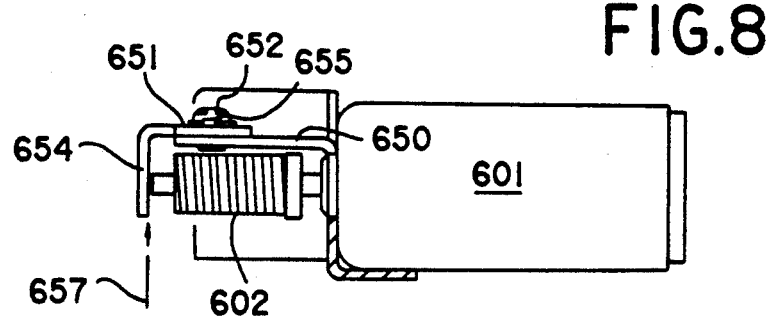

FIGS. 7 and 8 show another example of the thrust receiving means. A bracket 650 is formed on the frame 700, on which a thrust plate 651 having a thrust receiving end 654 is pivotally mounted by a screw 652. The plate 651 has an arcuated hole 653 which engages with a pin 655 mounted on the bracket 630. Thus, the gap between the end 654 and the end of the worm 602 can be adjusted by swinging the plate 651 about the screw 652.

Figure 9:
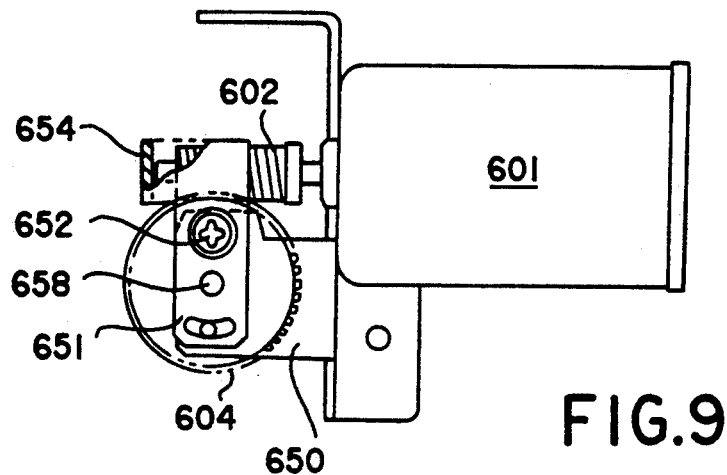

FIG. 9 shows another example, in which the thrust plate 651 is pivotally mounted on a shaft 658 for the worm wheel 604.

The worm wheel 604 is operatively connected through gears 605 and 606 to a teeth 611 formed on a periphery of a disk cam 610 so as to rotate the cam.

Figure 10:
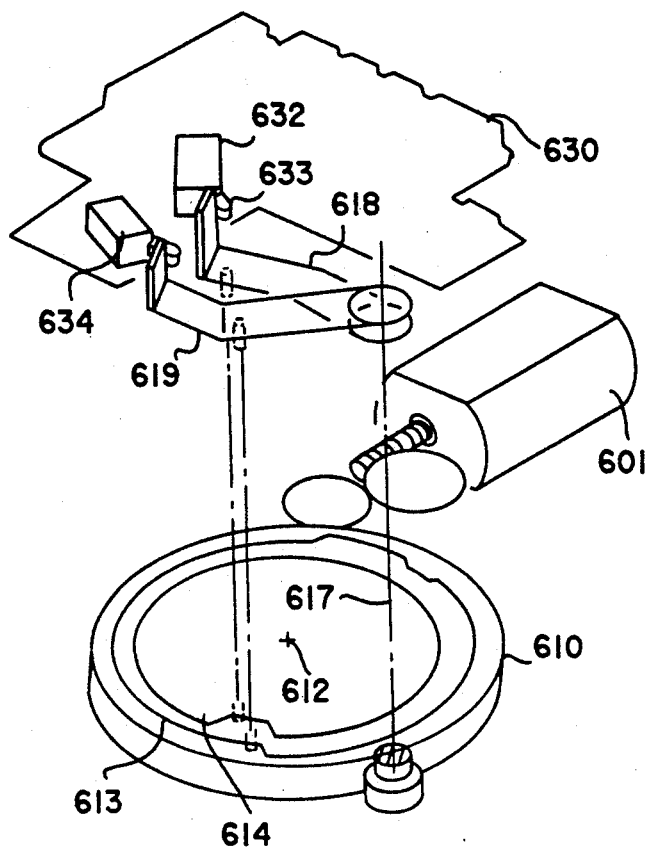
FIGS. 10 and 11 are perspective views showing a cam operated switches.
Figure 11:
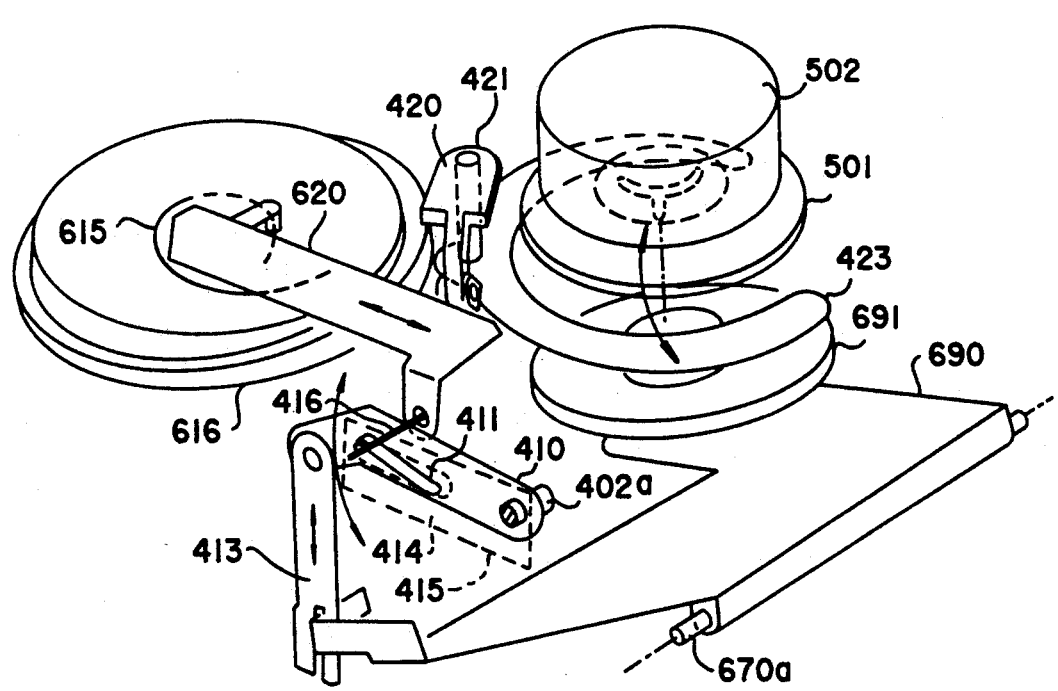

Referring to FIGS. 10 and 11, the disk cam 610 is pivotally mounted on a shaft 612 and has three cam grooves 613, 614 and 615, and a projected cam 616. A pair of levers 618 and 619 pivotted on a pin 617 engage with the cam grooves 613 and 614 at engaging ends, respectively. Engaged with the cam groove 615 is a slide lever 620 having an engaging pin 416 and provided to be moved by the cam groove in the longitudinal direction of the player.

Above the cam 610, a substrate 630 is secured to the shaft 612 by a screw 631. On the substrate 630, a tray position detecting switch 632 and a CD position detecting switch 634 are mounted. The switches 632 and 634 are adapted to be operated by the levers 618 and 619.

When the tray 101 is in the magazine 100, the cam 610 is at an initial position, where the lever 618 engages with an operating rod 633 to close the switch 632. The cam 610 starts to rotate for loading the CD, the lever 618 separates from the rod 633 to open the switch. When the CD is clamped on a turntable as described hereinafter, the lever 618 engages with the rod 633 to close the switch again. Namely, the switch 632 produces output signals when the CD is in the magazine and at the clamping position, and when CD starts to move from the magazine and from the clamping position.

Figure 12:
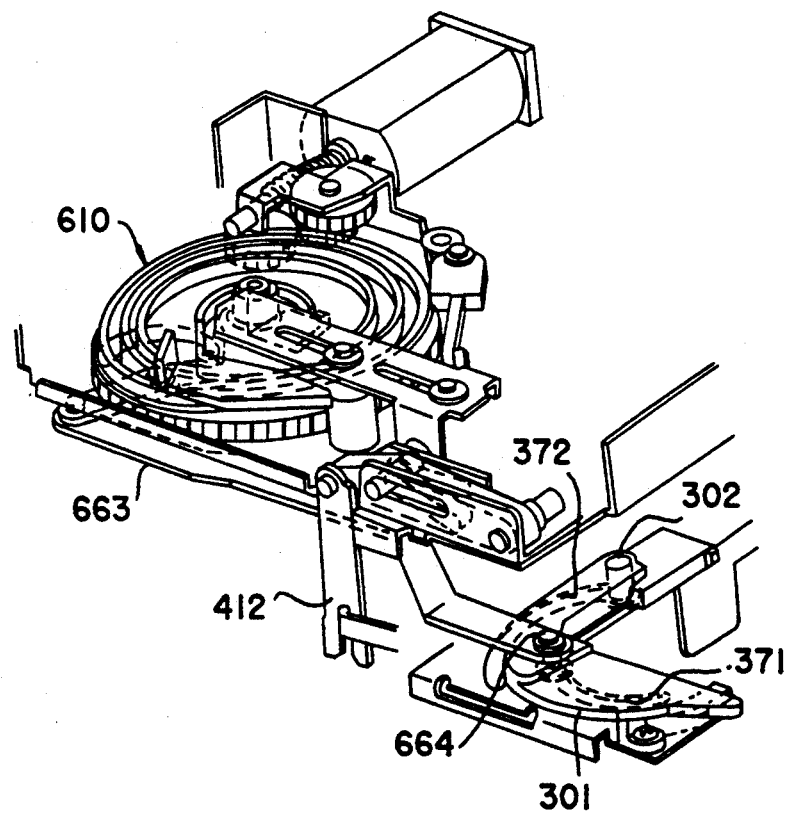
FIGS. 12, 13 and 14 are perspective views showing a tray loading device.
Figure 13:
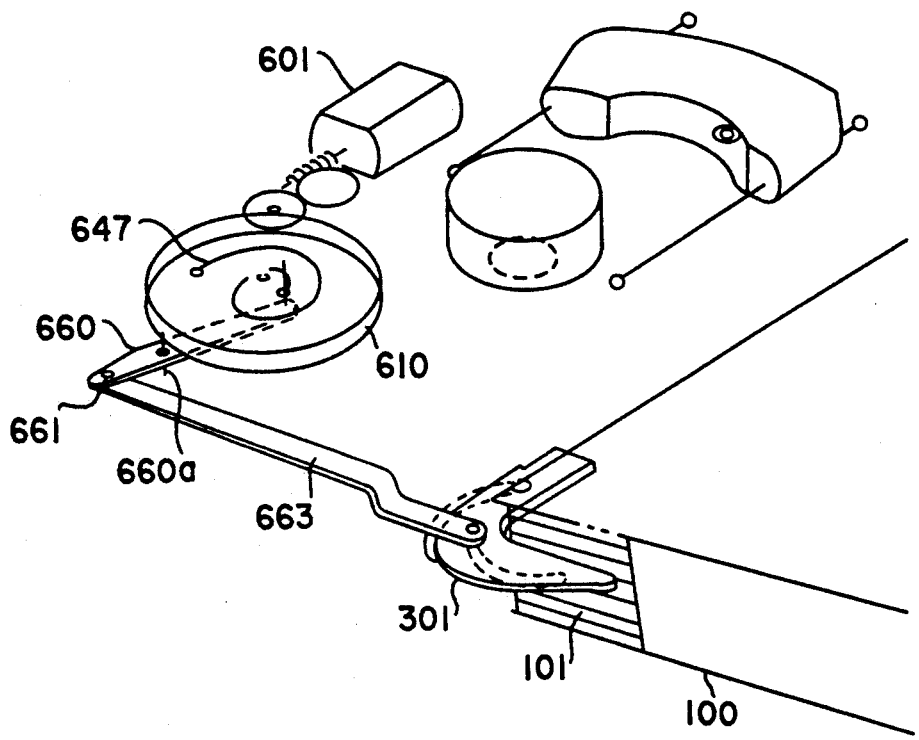
Figure 14:
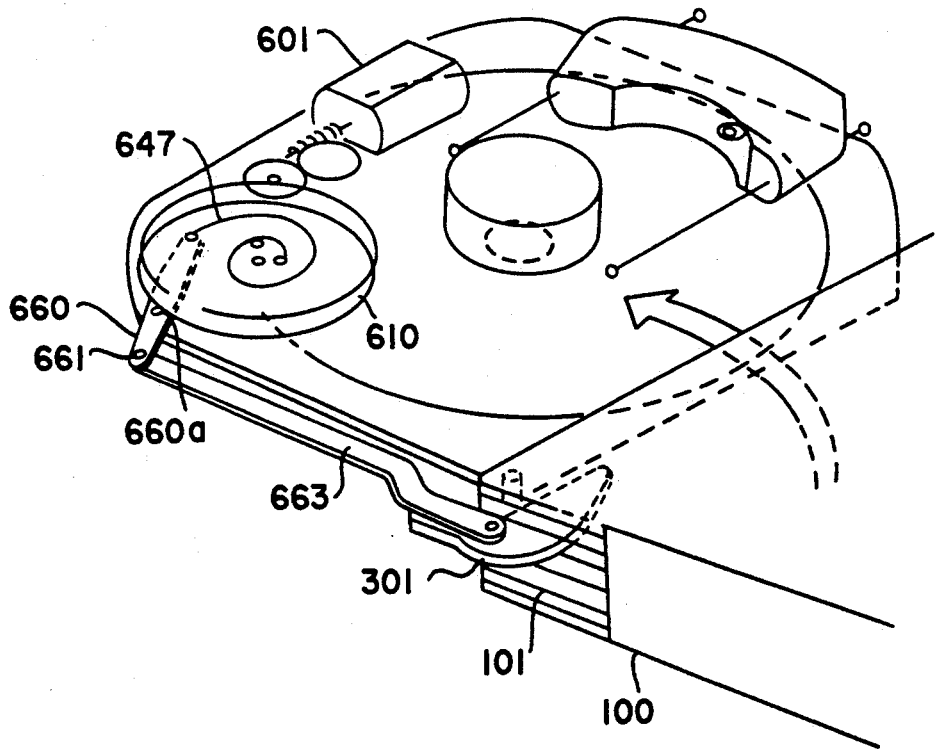

Referring to FIGS. 12 to 14, on the underside of the cam 610, a cam groove 647 is provided for loading the tray 101. An end of a lever 660 pivotted at 660a is slidably engaged with the cam groove 647, and the other end of the lever is connected to an end of a connecting link 663 by a pin 661. The other end of the link 663 is connected to the loading lever 301 by a pin 664.

Figure 15:
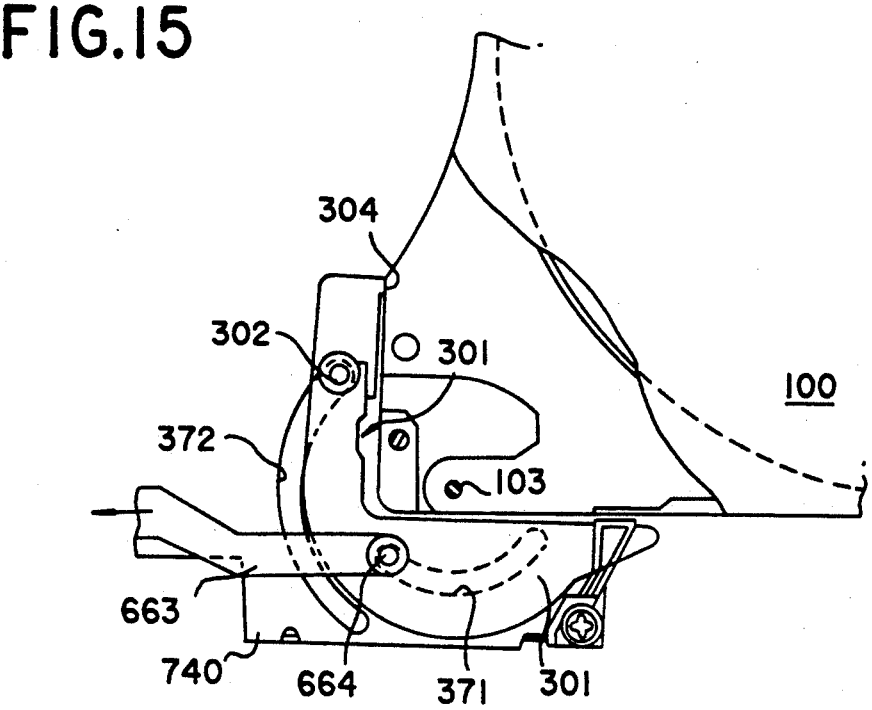
FIGS. 15 and 16 are plan views showing the tray loading device.
Figure 16:
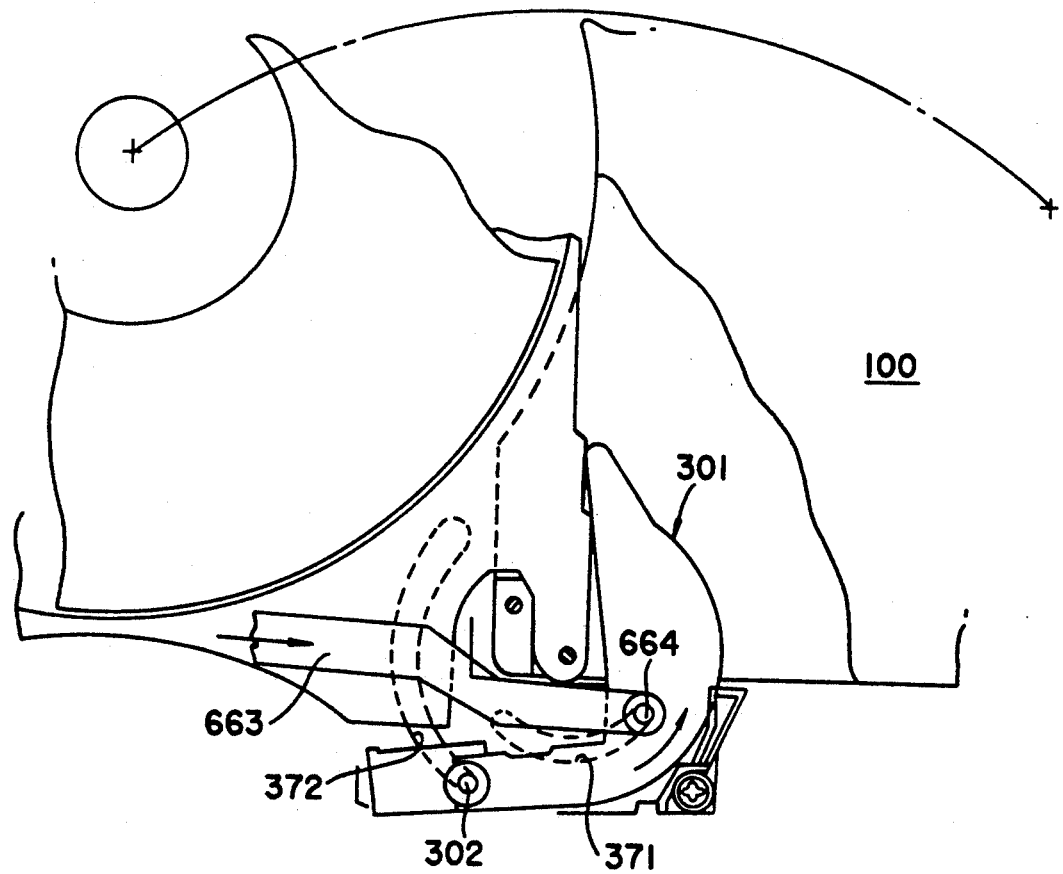

Referring to FIGS. 15 and 16, the loading lever 301 is pivotally mounted on pin 302 which is slidably engaged with an arcuated slit 372 formed in a frame 740. On the other hand, the pin 664 is slidably engaged with an arcuated slit 371. Both the slits 372 and 371 have arcs with respect to the axis 103. A cam 308 is provided on the frame 740 for guiding the loading lever 303. The lever 303 has a positioning end 304 for positioning the tray 101 in the magazine 100 at the position of FIG. 13.

When the cam 610 rotates in the clockwise direction, the link 663 is moved forward (in the direction to the front part of the player) to turn the loading lever 303 in the counterclockwise direction along the slits 371 and 372.

In an early period, the pin 302 does not move, but only the pin 664 moves, so that the loading lever 301 is turned, guided by the cam 308 on the periphery thereof. Thus, the lever 303 is moved from the position of FIG. 15 to the position of FIG. 16, so that one of trays 101 is pivotted about the axis 103 to the loading position. When unloading the tray, the cam 610 is reversely rotated, so that the loading lever 301 is turned in the reverse direction. The end 304 pushes the tray, thereby turning the tray into the magazine.

Figure 17:
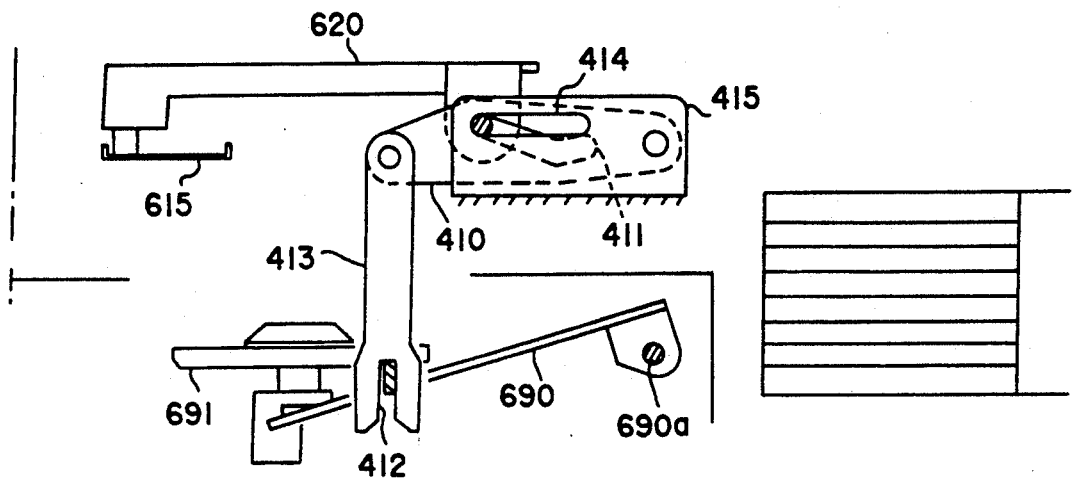
FIGS. 17 and 18 are side views showing cam operated switches.
Figure 18:
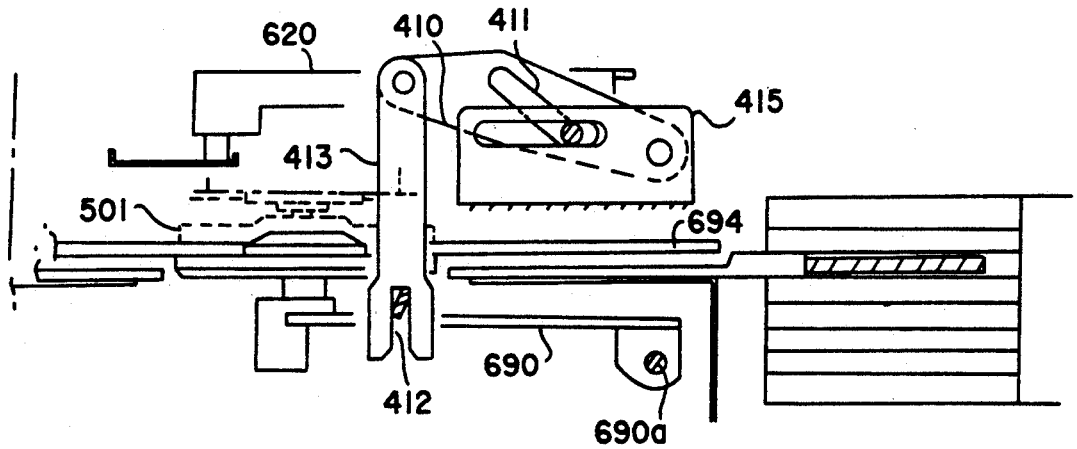

Referring to FIGS. 11, 17 and 18, the engaging pin 416 of the slide lever 620 slidably engages with a horizontal slit 414 of a guide plate 415 and slidably engages with an inclined slit 411 of a lever 410 which is pivotted on a pin 402a. The lever 410 is connected to a vertical lever having an end slit 412 which is engaged with an end of a clamping arm 690. The clamping arm 690 is pivotally mounted on a shaft 690a at an end and connected to a CD clamper 691 at the other end.

When the slide lever 620 is forwardly moved by the cam groove 615, the lever 410 is pivotted in the clockwise direction to elevate the lever 413. Following the lever 413, the arm 690 is upwardly pivotted by a spring (not shown), so that the clamper 691 clamps a CD 694 on the tray 101 projected from the magazine 100 on a turntable 501. The turntable 501 is rotated by a motor 502.

Figure 19:
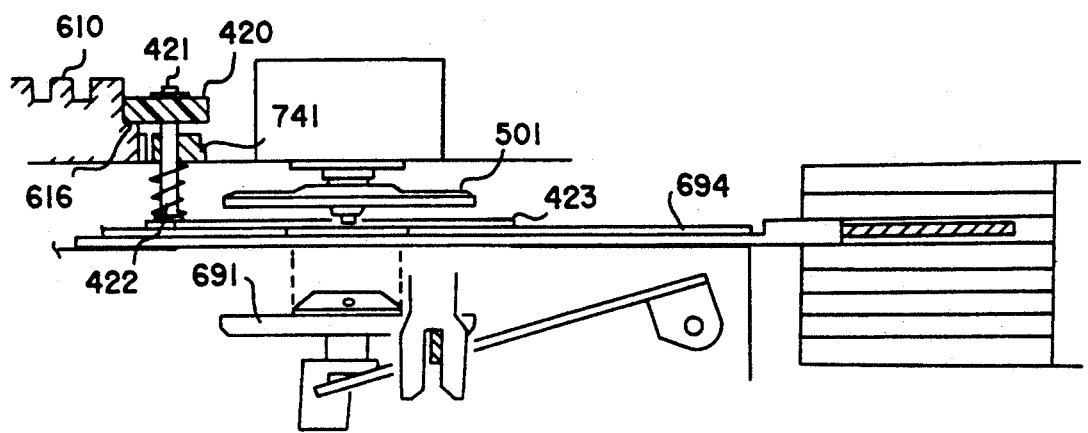
FIGS. 19 and 20 are side views showing a part of a turntable.
Figure 20:
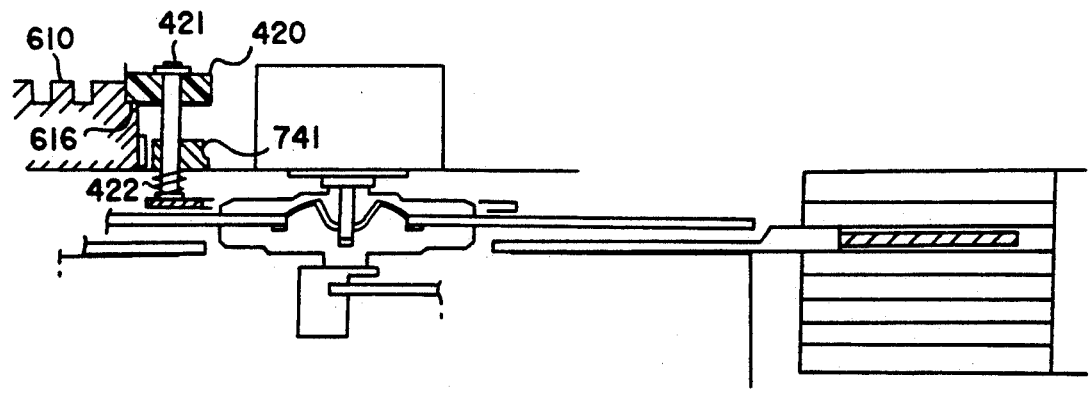

Referring to FIGS. 19 and 20, on the cam 616, a cam follower 420 is slidably mounted. The cam follower 420 is secured to a CD backup lever 423 through a shaft 421 which is slidably mounted in a frame 741. The cam follower is urged to the cam 616 by a spring 422.

When the cam 616 rotates, the cam follower 420 is vertically moved, thereby moving the lever 423, keeping a gap between the lever and the CD. When the CD 694 is clamped on the turntable 501 by the clamper 691, the lever 423 is upwardly moved as the clamper moves. When the CD is removed, the lever 423 is lowered by the cam 616.

Figure 21:
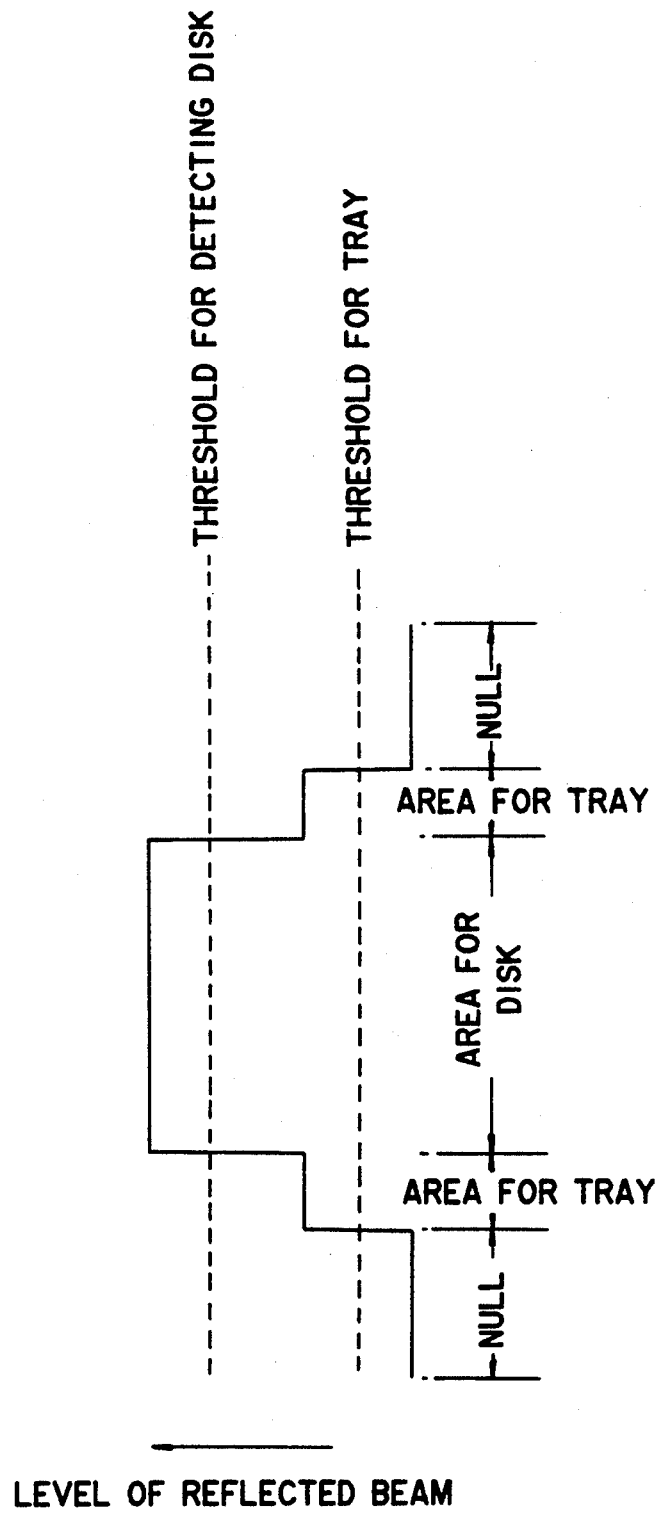
FIG. 21 is a graph showing output of a photosensor.

Referring to FIG. 4, a photosensor P is provided adjacent the tray 101 at the playing position for detecting the existence of the tray. As shown in FIG. 21, the photosensor P produces an output signal having various level according to the level of the reflected beam from the CD and the tray. From the level, the removal of the CD from the turntable can be detected.

Figure 22:
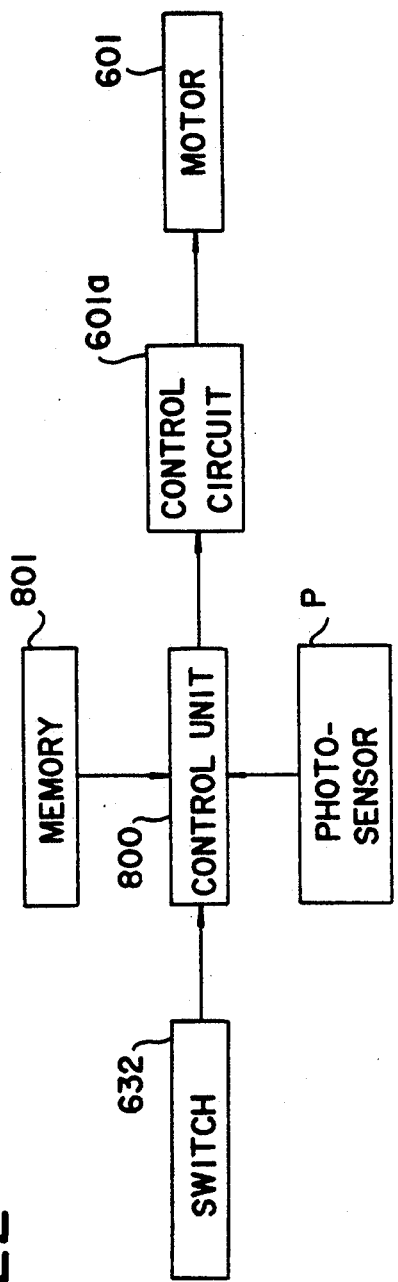
FIG. 22 is a block diagram of a motor control system.

The output signals of the photosensor P and the tray position detecting switch 632 are applied to a control unit 800 shown in FIG. 22. A memory 801 stores a program for reading the output signal of various switches and for controlling each motor in accordance with the results of reading the signal.

Figure 24:
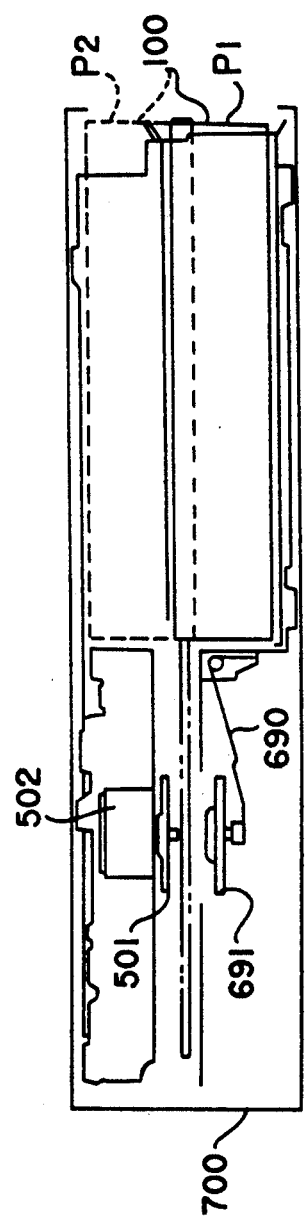
FIG. 24 is a schematic side view showing dispositions of components of the CD player.

Referring to FIG. 24, the magazine 100 is stowed in a front portion in the frame 700, and the tray loading device, clamper 691, turntable 501, driving mechanism and other necessary components are provided in a rear portion of the frame 700. The magazine is elevated between the lower most position $P_1$ and the upper most position $P_2$. The frame 700 has a necessary minimum height for allowing such an elevation of the magazine, and other components are housed in the frame within the height.

In operation, the pins 215 of the magazine holder 216 engage with the uppermost steps 213, so that the magazine holder is held at the uppermost position before the playback. The magazine 100 is inserted into the magazine holder 216 from the inlet 205 by hand. The side of the magazine abuts on the end 256 of the swing lever 240 to pivot the lever in the clockwise direction against the spring 242. At the terminal end, the switch operating end 254 engages with the actuating lever 257 of the switch 253, thereby producing a signal representing the completion of the charging of the magazine 100.

The user operates a CD select switch provided on the dashboard of the car, so that the motor 608 starts to rotate the gear train 607. Thus, the slide plate 220 is forwardly moved and the slide plate 221 is rearwardly moved to lower the magazine holder 216 to a desired position dependent on the selection of the CD. The desired position is detected by the output signal of the photosensor 232 detecting the slits 231 of the position detector plate 230.

When a play key is operated, the motor 601 starts to rotate the cam 610 in the clockwise direction. As described above, the link 660 and the loading device 300 are operated to load the tray 101 of the selected CD to the playback position A (FIG. 4), and then the CD is removed from the tray by the arm 690 and the clamper 691 and clamped on the turntable 501 by the clamper 691 (FIG. 18). Therefore, the motor 502 is driven to rotate the CD, thereby playing the CD.

Figure 25:
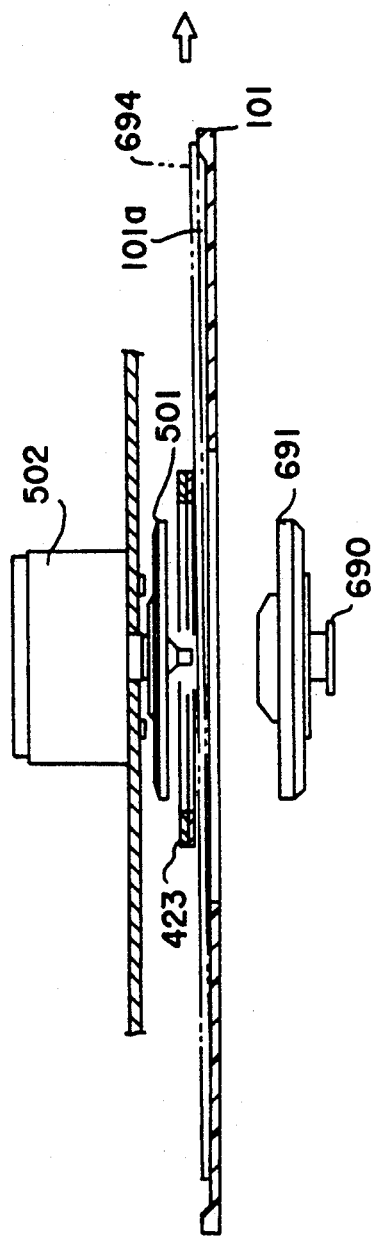
FIGS. 25 and 26 are side views showing a part of the turntable.
Figure 26:
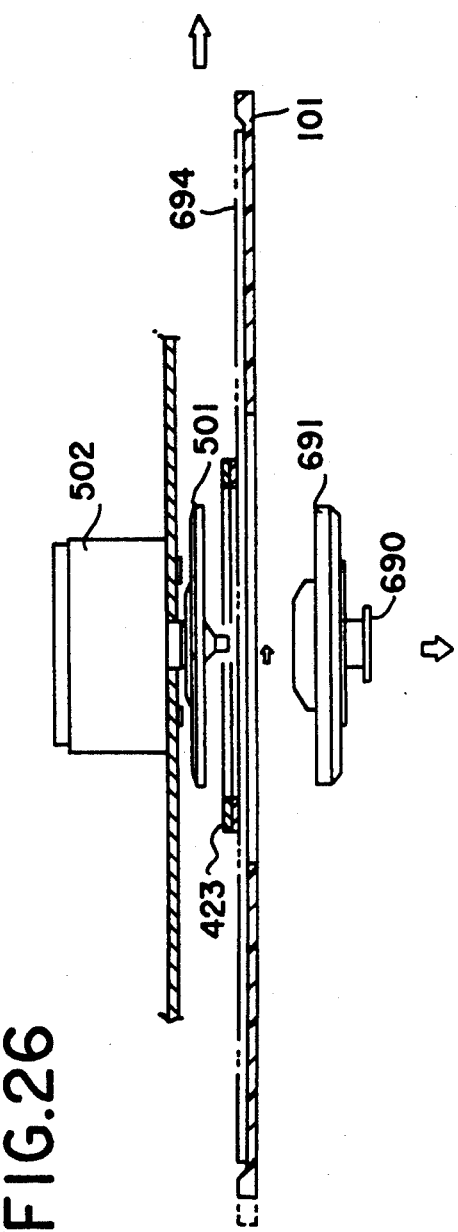

When the CD is clamped on the turntable, the switch 632 produces a clamp finish signal. In response to the clamp finish signal, the control unit 800 (FIG. 22) produces a driving signal which is applied to a motor control circuit 601a, and hence the motor 601 operates to further turn the cam 610 in the clockwise direction at a small angle. Thus, the tray 101 is slightly shifted to the left as shown in FIG. 25 by the loading device 300, so that the center of the tray is deflected from the center of the turntable 501.

When the playing of the CD finishes, the motor 601 operates in reverse to rotate the cam 610 in the counterclockwise direction. Thus, the clamper 691 is lowered, so that the CD is released from the turntable 501 and put on the tray 101. At that time, since the center of the turntable 501 is deflected from the center of the tray as described above, a part of the CD 694 is put on an edge of a groove 101a of the tray as shown in FIG. 25. The loading device 30 operates in the reverse to move the tray 101 to the right in FIG. 25. At that time, the CD backup lever 423 is slightly lowered to depress the CD, so that the CD is exactly fitted in the groove 101a of the tray 101.

The switch 632 produces a CD start signal, or a second signal, when the CD is released from the clamping state on the turntable, and a CD arrival signal, or a first signal, is produced when the tray is returned to the magazine. If the tray is caught by a member in the player, the tray cannot be returned to the magazine. When the CD arrival signal is not applied to the control unit 800 in spite of elapsing two or more seconds after the receiving of the CD start signal, the control unit 800 reads the level of the output signal of the photosensor P. When the output signal represents the existence of the tray or CD, the control unit 800 sends a return signal to the motor control circuit 601a which in turn produces a signal for reversely driving the motor 601. Thus, the motor 601 is operated in reverse to return the tray 101 to the turntable, and then the motor is rotated in the opposite direction, so that the tray is moved to the magazine. When the tray is returned to the magazine, the switch 632 produces a playback finish signal which is supplied to the control unit 800.

The control unit 800 produces a return signal to reversely operate the motor 608. Consequently, the slide plates 220 and 221 are moved in the reverse direction of the starting, thereby elevating the magazine holder 216 to the uppermost position.

Although the retrying operation for the tray is performed when the tray is returned to the magazine, the retrying may be performed when the tray is caught by a member in mid course from the magazine to the turntable for reproducing the CD.

In accordance with the present invention, the carrying of the CD tray or the CD between the magazine and the turntable is repeated when the tray or the CD does not arrive at the terminal position. Therefore, the tray or the CD staying in the player can be recovered.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for recovering a CD in a CD player having a magazine containing a plurality of trays each of which mounts the CD, and a moving device for moving one of the trays between the magazine and a playback position, said moving device having a rotating member, and a link mechanism cooperating with the rotating member for moving the tray between the magazine and the playback position, comprising:

actuating means provided on said rotating member;

a switch operated by said actuating means, said actuating means actuating said switch to produce a first signal when said tray is located in said magazine and said switch also produces said first signal when said tray is at said playback position, and to produce a second signal when said rotating member starts to rotate to release the CD from a clamping position;

control means responsive to said first and second signals for reversely rotating said rotating member for returning the tray to an initial position when a subsequent first signal is not supplied thereto after a predetermined time from the production of the second signal.

2. The system according to claim 1, further comprising detector means for detecting said tray when the tray is between the magazine and playback position and for producing a return signal, wherein the control means is further responsive to the return signal for returning the tray to the initial position.

3. The system according to claim 1, wherein said actuating means comprises cam grooves formed on said rotating member.

* * * * *